United States Patent Office

2,992,096
Patented July 11, 1961

2,992,096
PROCESS FOR REFINING AND IMPROVING THE QUALITY OF STEEL AND OTHER FERROUS METALS
Heber J. Hamlet, 6915 SE. 66th Ave., Portland 6, Oreg.
No Drawing. Filed Jan. 19, 1960, Ser. No. 3,264
6 Claims. (Cl. 75—43)

My invention relates particularly to the producing of a quality of slag during the melting of the metal in the furnace, thereby producing a steel or other ferrous metal with a finer grain, a higher tensile strength, and that will respond more readily to carbon or alloys.

One object of my invention is to provide a method and process by which the impurities and gasses are so eliminated during the melting process as to result in the production of a steel or other ferrous metal having a finer grain or texture, a higher tensile strength, and which process will prove beneficial when used in connection with carbon or alloys.

Another object of my invention is to provide a method and process by which the proper amount of my compound may be determined by the condition and depth of the slag forming on top of the molten metal while in the furnace.

Another object of my invention is to produce a slag of such a quality and quantity that the same may serve as an index to the quality of the steel or other ferrous metal which is being produced.

Still another object of my invention is to provide a compound which will produce the desired texture of steel or other ferrous metals by placing the prescribed quantity of the compound in the furnace at the time of the melting process.

Other and further objects of my invention will become apparent to the operator of the furnace by reason of the condition of the slag after the use of my compound as set forth in my specification and claims.

My Cleansteel Compound consists of one-third raw bone meal and two-thirds lava rock, red lava rock being preferred.

In making steel where my method and process have been followed, whether my compound is used either with or without other additives or alloys, it has been found that the steel so manufactured is of a much finer grain, of greater tensile strength, and is better adapted to hardening than steel made without the application of my compound of bone meal and lava rock, especially red lava rock, as set forth in the specification and claims of this application.

In the claims hereafter set forth I have indicated a preferred quantity of my compound for use during the melting process. While the quantity indicated should produce the desired quality of steel the scrap metal used for making steel may vary in its metal and chemical contents to such an extent as to vary the slag formed during the melting process.

The man in charge of the furnace is accustomed to examine the slag formed in the furnace to indicate whether or not further additives are required for producing the quality of steel or metal desired, and one of the great advantages in connection with my method and process resides in the fact that use of more of the compound than that indicated in my claims will in no way injure the steel or metal which is being produced.

My process and method used in connection with the melting of all kinds of metals from crude, impure iron, pigs or ingots, including all classes of scrap iron regardless of any other metals which may have been used in the manufacture of the scrap iron, involves the following steps:

First: Charge the furnace with two-thirds of the metal being melted in the furnace;

Second: Place on top of the metal then in the furnace, for each square foot of area in the plane of the slag line, one and one-third pounds of Cleansteel Compound, consisting of one-third raw bone meal and two-thirds ground lava rock;

Third: Charge the furnace with the remaining one-third of the metal to be melted so as to cover the Cleansteel Compound;

Fourth: Melt the metal to a flux or fluid state and then charge the furnace on top of the melted metal with two-thirds of a pound of Cleansteel Compound to each square foot of the surface of the melted metal at the slag line;

Fifth: Follow the regular method and process of adding other alloys in common use for producing a desired quality in the final metal product, the same as would be done if Cleansteel Compound were not used.

By using my compound in the foregoing process the manufactured metal product will have a much finer grain, greater tensile strength and be better adapted to hardening than that made without the application of my compound of bone meal and lava rock. While red lava rock has been most readily obtainable and is referred for that reason as well as for its apparent quality of speeding up the melting and fluxing of the metal in the furnace, I claim as a part of my discovery and invention the use of all kinds of lava rock and am not limiting my claims to the use of red lava rock only.

I claim:

1. In the manufacture of steel by the melting of scrap steel: (1) charge the furnace with two-thirds of the metal being used for the making of steel; (2) place on top of the metal then in the furnace, for each square foot of area in the plane of the slag line, one and one-third pounds of Cleansteel Compound, consisting of one-third raw bone meal and two-thirds ground red lava rock; (3) charge the furnace with the remaining one-third of the metal to be melted so as to cover the Cleansteel Compound; (4) melt the metal to a fluid state and then charge the furnace on top of the melted metal with two-thirds of a pound of Cleansteel Compound to each square foot of the surface of the melted metal at the slag line; (5) follow the regular method and process in the same way as would be done if Cleansteel Compound were not used.

2. In the manufacture of steel by the melting of scrap steel: (1) charge the furnace with two-thirds of the metal being used for the making of steel; (2) place on top of the metal then in the furnace, for each square foot of area in the plane of the slag line, one and one-third pounds of Cleansteel Compound, consisting of one-third raw bone meal and two-thirds ground lava rock; (3) charge the furnace with the remaining one-third of the metal to be melted so as to cover the Cleansteel Compound; (4) melt the metal to a fluid state and then charge the furnace on top of the melted metal with two-thirds of a pound of Cleansteel Compound to each square foot of the surface of the melted metal at the slag line; (5) follow the regular method and process in the same way as would be done if Cleansteel Compound were not used.

3. In the manufacture of steel by the melting of scrap steel in which additives are used during the melting process: (1) charge the furnace with two-thirds of the metal being used for the making of steel; (2) place on top of the metal then in the furnace, for each square foot of area in the plane of the slag line, one and one-third pounds of Cleansteel Compound, consisting of one-third raw bone meal and two-thirds ground red lava rock; (3) charge the furnace with the remaining one-third of the metal to be melted so as to cover the Cleansteel Compound; (4) melt the metal to a fluid state and then charge the furnace on top of the melted metal with two-thirds of a pound of Cleansteel Compound to each square foot of the surface of the melted metal at the slag line; (5) follow the regular method and process in the use of other additives in the same way as would be done if Cleansteel Compound were not used.

4. In the manufacture of steel by the melting of ferrous metal in which additives are used during the melting process: (1) charge the furnace with two-thirds of the metal being used for the making of steel; (2) place on top of the metal then in the furnace, for each square foot of area in the plane of the slag line, one and one-third pounds of Cleansteel Compound, consisting of one-third raw bone meal and two-thirds ground lava rock; (3) charge the furnace with the remaining one-third of the metal to be melted so as to cover the Cleansteel Compound; (4) melt the metal to a fluid state and then charge the furnace on top of the melted metal with two-thirds of a pound of Cleansteel Compound to each square foot of the surface of the melted metal at the slag line; (5) follow the regular method and process in the use of other additives in the same way as would be done if Cleansteel Compound were not used.

5. In a compound for use in the making of steel: consisting essentially one-third raw bone meal and two-thirds red lava rock, ground to any convenient consistency, screen 10 being found desirable.

6. In a compound for use in the making of steel: consisting essentially one-third raw bone meal and two-thirds lava rock, ground to any convenient consistency, screen 10 being found desirable.

No references cited.